No. 796,901. PATENTED AUG. 8, 1905.
H. DOOL.
SAW.
APPLICATION FILED SEPT. 13, 1904.
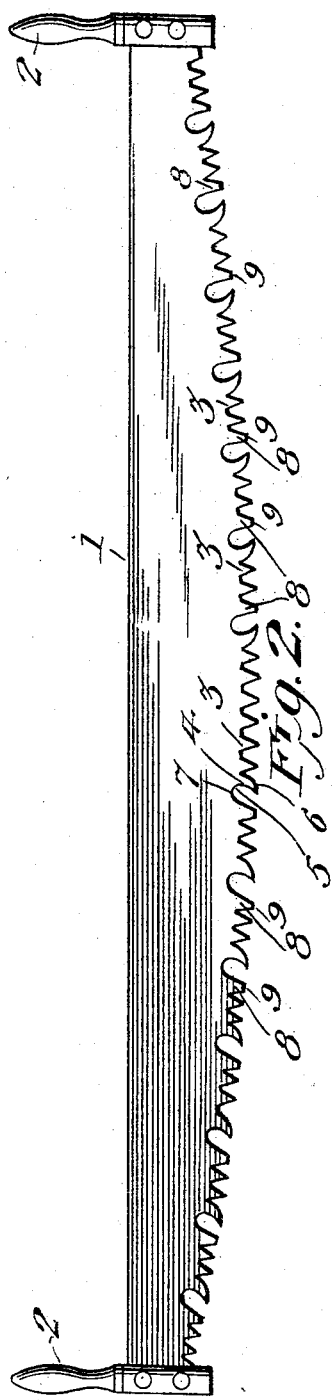
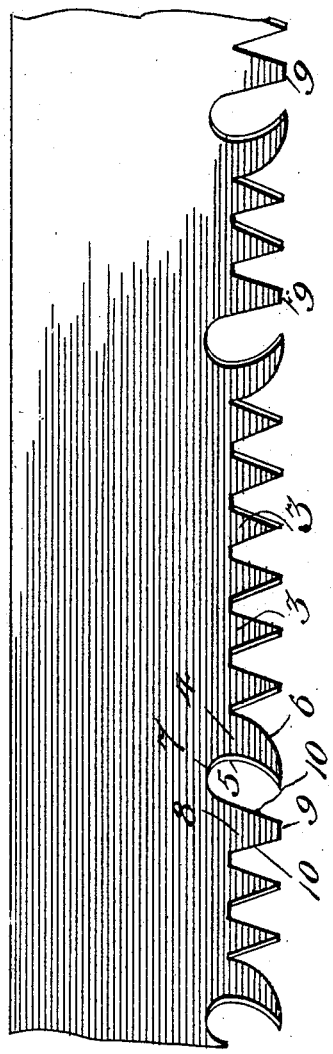
Witnesses
Geo. Ackman Jr.
D. W. Gould.
Inventor
Henry Dool,
By Victor J. Evans
Attorney

UNITED STATES PATENT OFFICE.

HENRY DOOL, OF NORTHFORK, CALIFORNIA.

SAW.

No. 796,901.　　　　Specification of Letters Patent.　　　　Patented Aug. 8, 1905.

Application filed September 13, 1904. Serial No. 224,346.

*To all whom it may concern:*

Be it known that I, HENRY DOOL, a citizen of the United States, residing at Northfork, in the county of Madera and State of California, have invented new and useful Improvements in Saws, of which the following is a specification.

The invention relates to an improvement in saws, and particularly crosscut-saws of the single-raker type. It is very desirable in saws of this character that some means be provided for regulating the depth of cut of the saw, and this result has been heretofore aimed at by a particular manner of filing. In practice, however, it has been found practically impossible to so file the teeth as to regulate with any degree of certainty the depth of cut of the saw, and in any event to alter the cut of any particular saw would require a complete refiling.

It is the object of the present invention to provide means for absolutely regulating and limiting the depth of cut of a saw, which means may be readily varied to alter such cut.

The invention will be described in detail in the following specification, taken in connection with the accompanying drawings, in which—

Figure 1 is a view in elevation of a single-raker crosscut-saw constructed in accordance with my invention. Fig. 2 is an enlarged elevation of a portion of the saw.

Referring to the drawings, wherein like reference-numerals indicate like parts throughout both views, my improved saw comprises a blade 1, having the usual operating-handles 2. The cutting edge of the blade, which is curved, as is usual in saws of this character, is provided with the usual cutting-teeth 3, preferably arranged in series and filed to the depth desired. Intermediate the sets of teeth 3 are arranged the raker-teeth 4, which teeth are of the single-raker type, having curved edges 5 and 6, the former of which is sharpened for cutting purposes. The opening in the blade adjacent the raker-tooth 4 extends rearward beyond the limit of the cutting-teeth 3 to form the usual pocket 7, adapted to receive the sawdust and carry the same from the kerf, as is usual.

The parts hereinbefore described are of usual construction in saws of this character, it being understood that the raker-teeth operate to draw the saw to its work and clear the kerf of sawdust by storing the same in the pockets 7. As shown in the drawings, the saw is adapted for cutting in both directions, the raker-teeth on the forward half of the saw curving in one direction, while the raker-teeth on the other half curve in the opposite direction, whereby one-half the saw will be cutting in each reciprocatory stroke.

It has been heretofore proposed to limit or gage the cutting depth of the saw by so filing the cutting-teeth as to present a determinate cutting edge only; but practice has developed the inaccuracy of this method owing to the fact that the raker-teeth operate to draw the saw to its work, and hence the cutting-teeth will exceed their filed limit in operation.

I propose to provide means for positively limiting the depth of cut of the teeth 3 without regard to their filed limit, such means comprising what I term "stub-teeth" 8, preferably arranged between the raker-teeth and the cutting-teeth in the direction of operation of said raker-teeth. The stub-teeth are square or rounded on their lower edge 9, having the usual inclined edges 10, that edge adjacent the raker-tooth being preferably coincident with the wall of the pocket 7, so that the stub-tooth is arranged immediately in front of said pocket in the cutting direction of the blade.

It is at once apparent that the length of the stub-tooth 8 will determine the cutting distance of teeth 3, as the raker-teeth operate to draw the saw into the material, which will continue until the end of the stub-tooth touches the base of the kerf limiting the depth of the cut.

The stub may be ordinarily filed for light cutting—that is, a shallow cut by the teeth 3—and the operator may regulate the cut to suit himself by simply filing the stub to shorten it, and thereby move its limiting end farther from the point of the cutting-teeth.

Although I have shown the stub-tooth as of practically similar shape with the cutting-tooth with the exception of its operative end, I do not wish to limit myself thereto, as the stub may be of any form desired, sharpened or otherwise, provided always that it be formed with the limiting end 9. Furthermore, it is not essential that such limiting end 9 be square and in a plane with the operative edge of the blade, as such end might be rounded or other shape with equally good result.

Having thus described the invention, what is claimed as new is—

A saw comprising the blade having cutting and stub teeth, and raker-teeth having reversely-curved edges interposed between the cutting and stub teeth, and each raker-tooth having on one of its curves a cutting edge, the central portion of the blade being provided with the greatest number of cutting-teeth, and the raker-teeth being reversely arranged on opposite sides of the central cutting-teeth, substantially as specified.

In testimony whereof I affix my signature in presence of two witnesses.

HENRY DOOL.

Witnesses:
MAMIE BRAMMER,
E. M. McCARDLE.